United States Patent [19]

Ninomiya

[11] Patent Number: 5,598,567
[45] Date of Patent: Jan. 28, 1997

[54] APPARATUS FOR CONTROLLING POWER SUPPLY IN A COMPUTER SYSTEM BY INTRODUCING DELAYS BEFORE ACTIVATION AND DEACTIVATION OF POWER

[75] Inventor: Ryozi Ninomiya, Tokyo, Japan

[73] Assignee: Kabushiki Kaisha Toshiba, Kawasaki, Japan

[21] Appl. No.: 341,925

[22] Filed: Nov. 16, 1994

Related U.S. Application Data

[63] Continuation of Ser. No. 784,715, Oct. 30, 1991, abandoned.

[30] Foreign Application Priority Data

Nov. 7, 1990 [JP] Japan .................................. 2-301688
Sep. 30, 1991 [JP] Japan .................................. 3-278693

[51] Int. Cl.$^6$ ............................................. G06F 1/26
[52] U.S. Cl. ........................................ 395/750; 323/318
[58] Field of Search ............................ 395/750; 364/707

[56] References Cited

U.S. PATENT DOCUMENTS

| | | | |
|---|---|---|---|
| 4,458,307 | 7/1984 | McAnlis et al. | 395/182.2 |
| 4,672,573 | 6/1987 | Shonaka | 395/182.2 |
| 4,768,162 | 8/1988 | Nishimura | 254/8 B |
| 4,839,248 | 6/1989 | Magnussen, Jr. et al. | 429/49 |
| 4,887,199 | 12/1989 | Whittle | 363/49 |
| 4,904,910 | 2/1990 | Hsu | 307/141 |
| 4,907,150 | 3/1990 | Arroyo et al. | 395/182.22 |
| 5,032,968 | 7/1991 | Mikami et al. | 363/37 |
| 5,142,165 | 8/1992 | Allard et al. | 307/130 |
| 5,151,855 | 9/1992 | Gray et al. | 395/750 |
| 5,218,607 | 6/1993 | Saito et al. | 395/182.2 |
| 5,222,231 | 6/1993 | Gunji | 395/188.01 |
| 5,239,495 | 8/1993 | Nanno et al. | 364/707 |
| 5,276,890 | 1/1994 | Arai | 395/750 |
| 5,339,446 | 8/1994 | Yamasaki et al. | 395/750 |
| 5,430,867 | 7/1995 | Gunji | 395/188.01 |
| 5,435,005 | 7/1995 | Saito | 364/247.3 |

FOREIGN PATENT DOCUMENTS 3636152 4/1988 Germany.

OTHER PUBLICATIONS

Toshiba Notebook Computer, T3300SL, Reference Manual, 1992, pp. 2-11 to 2-16.
Electronic Design, Mar. 31, 1983, R. M. Vaccarella, "CMOS with Battery Backup Gives Top Memory Protection", pp. 175-180.

*Primary Examiner*—Jack B. Harvey
*Assistant Examiner*—Sumati Lefkowitz
*Attorney, Agent, or Firm*—Oblon, Spivak, McClelland, Maier & Neustadt P.C.

[57] ABSTRACT

A computer system which can properly operate even when the power supply is reactivated immediately after its deactivation or when the power supply is deactivated during the execution of a resume process. When after voltage supply to individual components is inhibited by depression of a power supply switch, the power supply switch is depressed again for the voltage supply, a power supply controller determines whether or not a predetermined period of time has elapsed after the voltage supply is inhibited. Upon elapse of the predetermined period of time, the voltage supply to the individual components starts. In the case where a voltage is being supplied to the individual components by depression of the power supply switch, when the power supply switch is depressed again to inhibit the voltage supply, it is determined whether or not a resume process has been completed, or a predetermined period of time has elapsed from the beginning of the voltage supply. When the resume process has been completed, or the predetermined period of time has elapsed from the beginning of the voltage supply, the voltage supply to the individual components is stopped.

11 Claims, 7 Drawing Sheets

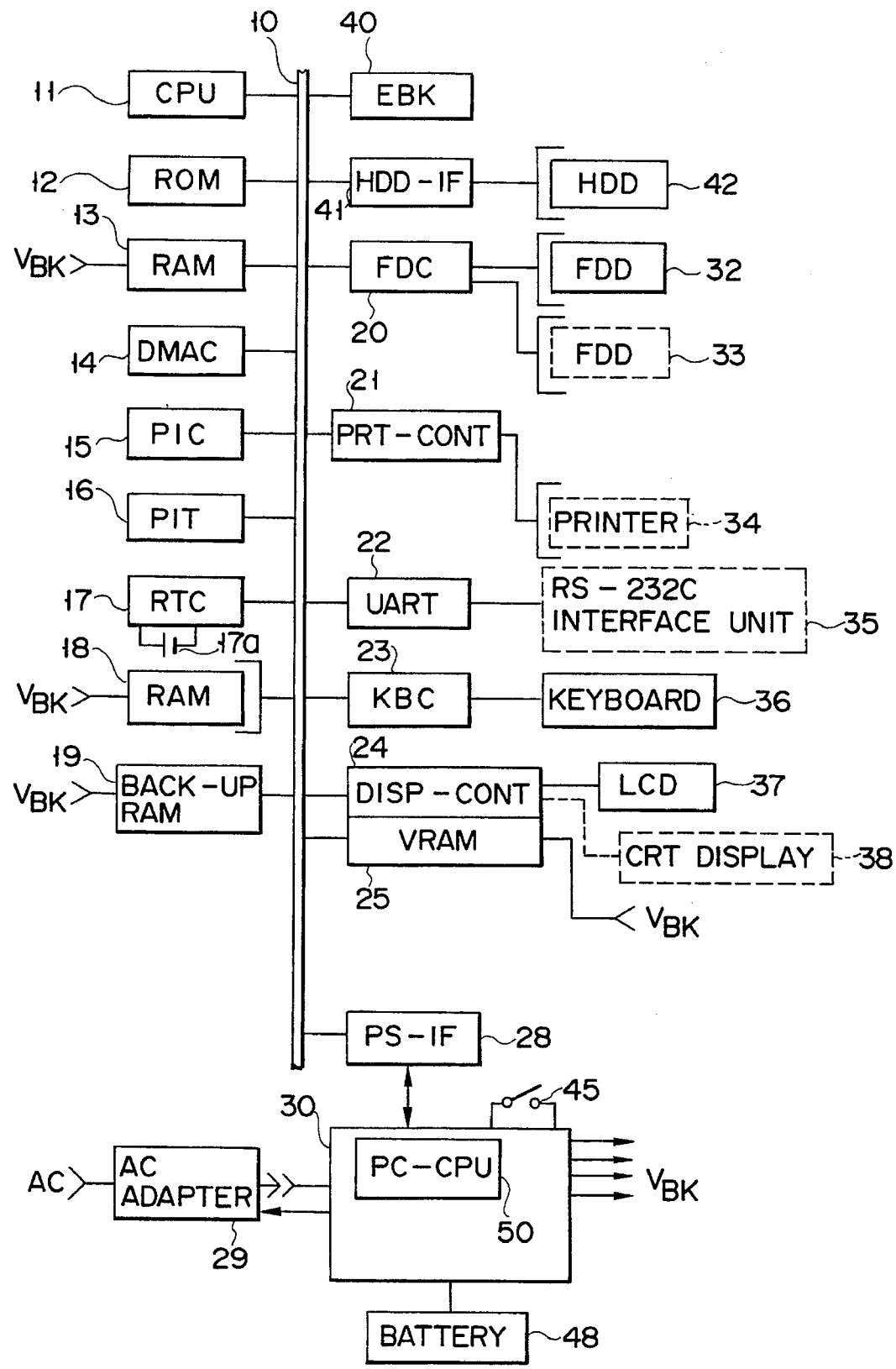
F I G. 2

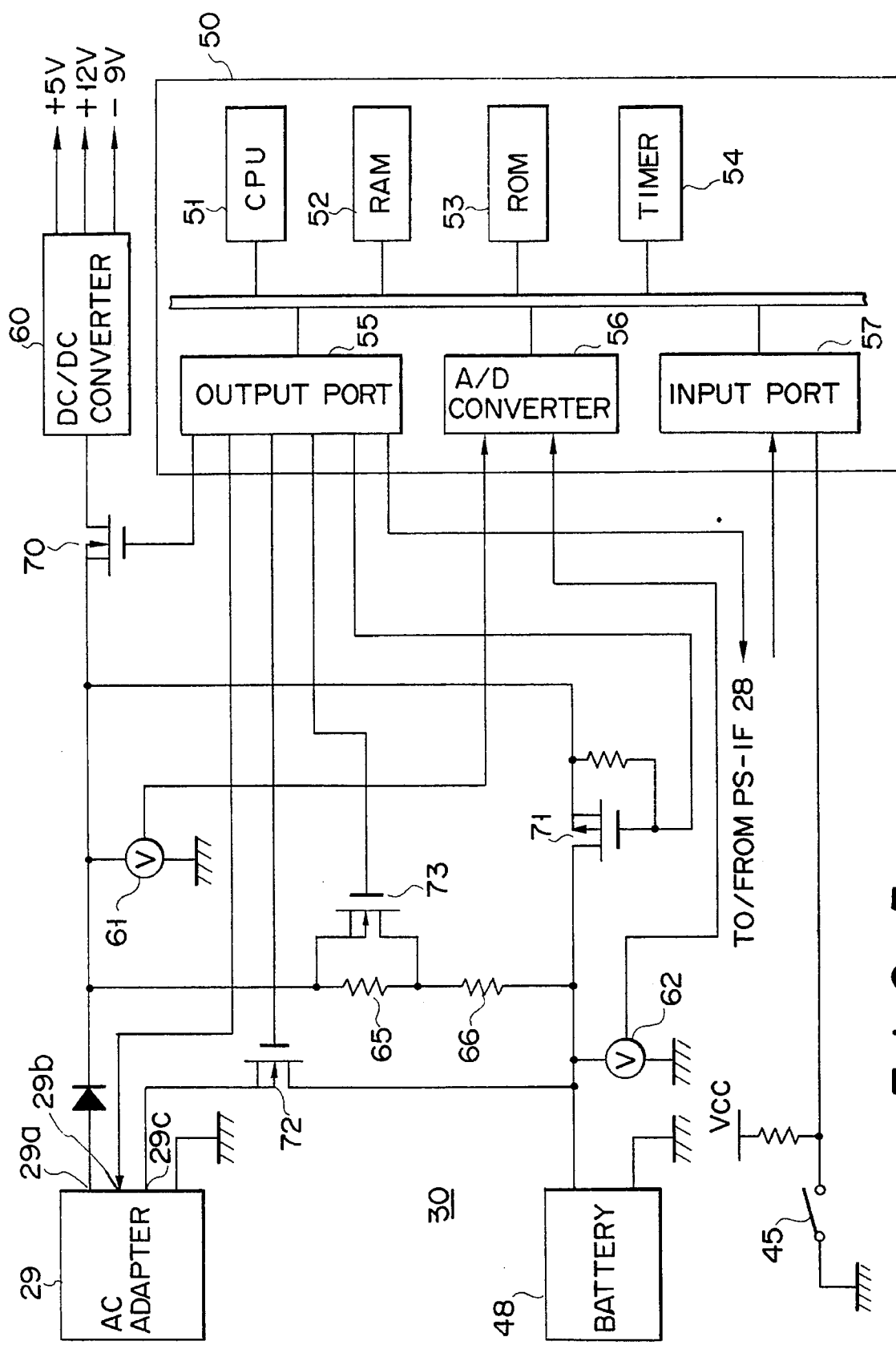
F I G. 3

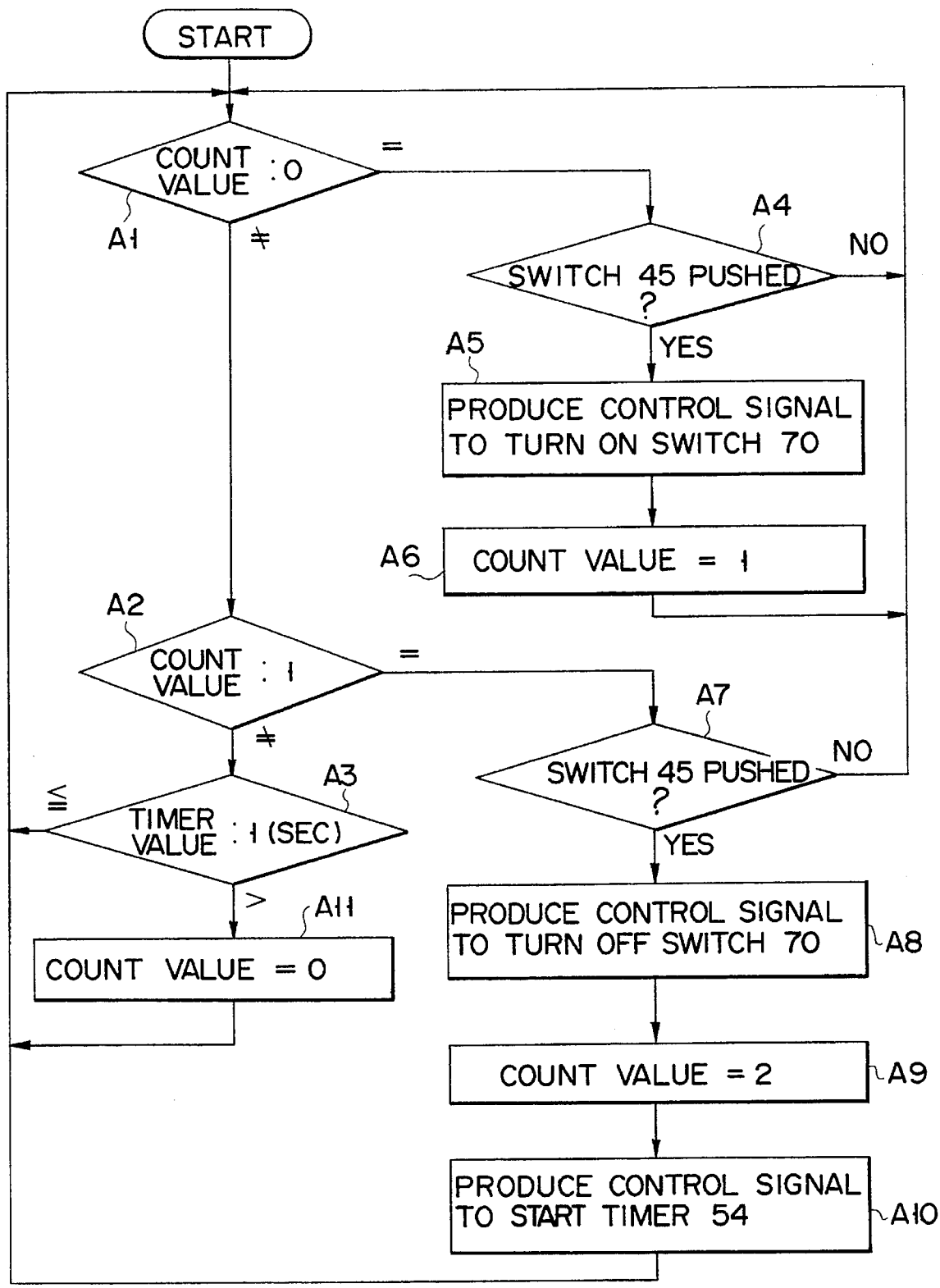
F I G. 4

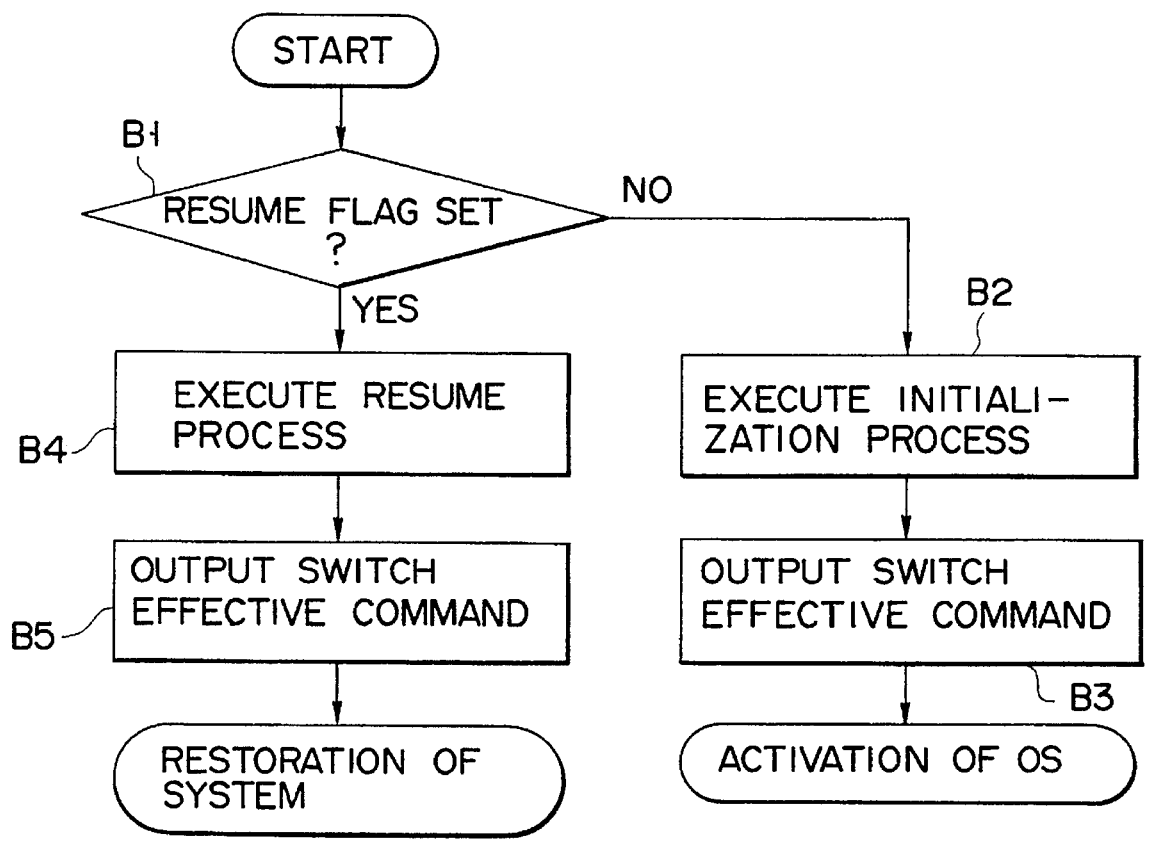
F I G. 5

APPARATUS FOR CONTROLLING POWER SUPPLY IN A COMPUTER SYSTEM BY INTRODUCING DELAYS BEFORE ACTIVATION AND DEACTIVATION OF POWER

This application is a continuation of application Ser. No. 07/784,715, filed on Oct. 30, 1991, now abandoned.

BACKGROUND OF THE INVENTION

1. Field of the Invention

The present invention relates to an apparatus for controlling a power supply.

2. Description of the Related Art

Many electronic devices, such as a laptop type personal computer and a word processor, are operated by an AC adapter or a rechargeable built-in battery, or on both.

Such an electronic device has a capacitor of a large capacitance provided on a power line from a power supply to supply a voltage to individual components of the electric device. When the power supply is deactivated, therefore, the power supply voltage on the power line will become 0 V only after a predetermined period of time elapses.

For instance, in the case where a capacitor of about 3000 µF is provided on the power line from the power supply that provides a voltage of +5 V and a load at the time of power turn off is about 100 Ω, it takes approximately 480 ms for the power supply voltage to become 1 V after the power supply is deactivated.

When the power supply is activated immediately after the electronic device is powered off, since the power supply is activated with a state that the power supply voltage on the power line has insufficiently been reduced, the following problems would arise.

With regard to a hard disk drive, for example, when the power supply is activated immediately after the turn off of the power supply, it takes time for the motor used in the hard disk drive to operate properly. In other words, when the power supply is deactivated while the motor is running, the rotor of the motor keeps rotating for a while due to the inertia. When the power supply is activated while the motor is rotating under this condition, since the hard disk drive operates to rotate the rotor by driving the motor again after rotation of the rotor completely stops. This takes time for the motor to operate properly.

After the power supply is activated, a power supply circuit in the power supply normally performs such control as to gradually increase the power supply voltage, or soft-start control. FIG. 1 shows a diagram of a circuit used to execute the soft-start control. Referring to FIG. 1, as the terminal voltage of a terminal DTC of a switch regulator 1 used to determine the maximum value of the switching duty becomes lower, the maximum value of the switching duty increases. When the power supply is activated, a low voltage is supplied from a terminal REF, and the terminal voltage at the terminal DTC decreases as the charging of the capacitor 2 progresses. The time necessary to sufficiently decrease the terminal voltage at the terminal DTC is determined by the time constant of the capacitor 2 and a resistor 3. When the power supply is reactivated immediately after its deactivation, since the capacitor 2 is not sufficiently discharged, the proper soft-start control cannot be executed. If the soft-start control is not executed at the time the power supply is activated, the charging of the capacitor provided on the power line in the power supply circuit causes a large current to flow through a switching FET (Field Effect Transistor), thereby damaging the FET sometimes.

DC-driven electronic devices having a capacitor provided on the power line in the power supply circuit has the above-described problems when the power supply is reactivated immediately after the power supply is deactivated.

For such an electronic device as a personal computer having a resume function, when the power supply is activated, the device carries out a data restoring process to restore the system to the state immediately before the previous deactivation of the power supply, or a resume process. When the power supply is deactivated during execution of this resume process, part of data group being restored may be destroyed. If the power supply is reactivated and the resume process is performed in such a case, only the data group without a destroyed part can be restored. In the case of a personal computer using 80386SL CPU recently developed by Intel corporation, when the power supply is deactivated during execution of the resume process, this CPU is likely to run away.

In view of the above, there is a demand for electronic devices which can properly operate even when the power supply is reactivated immediately after its deactivation, or even when the power supply is deactivated during execution of a resume process.

SUMMARY OF THE INVENTION

It is therefore an object of the present invention to provide an apparatus for controlling a power supply.

According to one aspect of the present invention, there is provided a power supply control apparatus to which a plurality of components are connected, comprising: a power supply switch; supplying means for supplying a voltage to the components; and control means for monitoring a switching status of the power supply switch and controlling the supplying means in accordance with the switching status of the power supply switch, and wherein when voltage supply to the components is inhibited, the control means controls the supplying means to continuously inhibit the voltage supply to the components until a predetermined period of time elapses after the voltage supply is inhibited.

According to another aspect of the present invention, there is provided a power source control apparatus to which a plurality of components are connected, comprising: a power supply switch; supplying means for supplying a voltage to the components; and control means for monitoring a switching status of the power supply switch and controlling the supplying means in accordance with the switching status of the power supply switch, and wherein when a voltage is supplied to the components, the control means controls the supplying means to continuously supplying the voltage to the components until a predetermined process is completed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram illustrating the configuration of a computer system used in one embodiment of the present invention;

FIG. 3 is a block diagram showing the structure of a power supply circuit according to one embodiment of this invention;

FIG. 4 is a flowchart for the first voltage supply control executed by a CPU in a power supply controller according to the embodiment of this invention;

FIG. 5 is an operational flowchart for a main CPU capable of performing a resume process according to the embodiment of this invention.

DETAILED DESCRIPTION OF THE EMBODIMENTS

Figure 1:
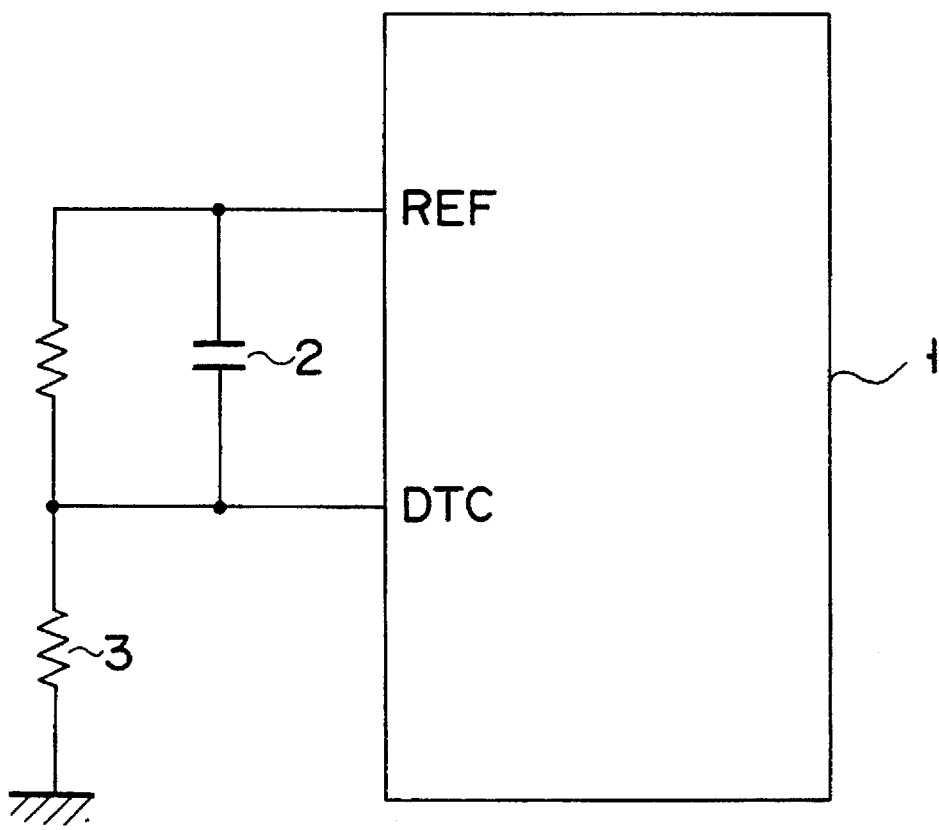
FIG. 1 is a diagram of a circuit in a power supply circuit of a power supply to execute soft-start control.

A preferred embodiment of the present invention will now be described referring to the accompanying drawings.

FIG. 2 shows a block diagram illustrating the configuration of a computer system used in one embodiment of the present invention. As shown in FIG. 2, this computer system comprises a system bus 10, a main CPU (Central Processing Unit) 11 for controlling the entire system, a ROM (Read Only Memory) 12 for storing a control program inherent to the system, etc., a RAM (Random Access Memory) 13, a direct memory access controller (DMAC) 14 for performing the direct memory access control, a programmable interrupt controller (PIC) 15 settable by a program, a programmable interval timer (PIT) 16 settable by a program, a real time clock (RTC) 17 as a timer module with a drive battery 17a, an expansion RAM 18 with a large capacity and connectable to a special card slot, and a backup RAM 19 for storing backup data, etc. to implement a resume function. The computer system also includes a floppy disk controller (FDC) 20. Floppy disk drives (FDDs) 32 and 33 are connected to the floppy disk controller 20 which controls these disk drives.

Further, the computer system comprises a printer controller (PRT-CONT) 21, a universal asynchronous receiver/transmitter (UART) 22 as an input/output interface, a keyboard controller (KBC) 23, a display controller (DISP-CONT) 24, a video RAM (VRAM) 25, a power supply interface (PS-IF) 28, an AC adapter 29, a power supply circuit 30 having a power controller (PC-CPU) 50, a keyboard 36, an LCD (Liquid Crystal Display) 37, an expansion bus connector (EBC) 40, a hard disk drive interface (HDD-IF) 41, a hard disk drive (HDD) 42, a power supply switch 45, and a battery 48.

A printer 34 or the like is selectively connected to the printer controller 21. An RS-232C interface unit 35 is connected to the universal asynchronous receiver/transmitter 22 as needed. The keyboard controller 23 controls a key input through the keyboard 36.

The display controller 24 controls the LCD 37 which is attached swingable to the computer body, or a CRT (Cathode Ray Tube) display 38 which is selectively connected to the computer.

The power supply interface 28 receives and transfers serial data from and to the power supply controller 50 in the power supply circuit 30.

The AC adapter 29, connectable to the computer system, is connected to an external power supply (not shown), and rectifies/smooths an AC voltage from the external power supply to output a DC voltage. If the AC adapter 29 is connected to the computer system to activate the system, the voltage is supplied from the AC adapter 29 through the power supply circuit 30 to each component of the computer system.

A backup voltage $V_{BK}$ is supplied to each of the RAMs 13 and 18, the backup RAM 19 and the VRAM 25.

The expansion bus connector 40 is used for functional expansion of the system. For example, an external hard disk drive is selectively connected to the expansion bus connector 40. An expansion unit (not shown) having various components, such as a keyboard, a CRT display, a memory, a connector to the body of the computer system, can also be selectively connected to the expansion bus connector 40.

The power supply switch 45 is used to activate this computer system, and has a momentary switch. When the DC voltage is not yet supplied to the individual components from the power supply circuit 30, or when the power supply is off, depression of the power supply switch 45 activates the power supply. When the DC voltage is supplied to the individual components from the power supply circuit 30 and the system is operated, or when the power supply is on, depression of the power supply switch 45 deactivates the power supply.

The battery 48 can be recharged and built in the computer system. If the AC adapter 29 is not connected to the computer system and the battery 48 is built therein instead, a DC voltage is supplied from the battery 48 through the power supply circuit 30 to the individual components of the computer system in order to activate the computer system. A nickel-hydrogen battery is used as the battery 48, for example.

The power supply circuit 30 will now be described. FIG. 3 is a structural block diagram illustrating the power supply circuit according to the embodiment of the prevent invention. The power supply circuit 30 includes the power supply controller 50, a DC/DC converter 60, voltage detectors 61 and 62, resistors 65 and 66, and FET switches 70, 71, 72 and 73.

The AC adapter 29 has a constant-voltage output terminal 29a, a control-signal input terminal 29b, and a constant-current output terminal 29c. A constant voltage of 18 V is output from the constant-voltage output terminal 29a. A constant current of 2.2 A is output from the constant-current output terminal 29c. A control signal from the power supply controller 50 is supplied to the control signal input terminal 29b. In response to the control signal, the AC adapter 29 outputs either the constant voltage or constant current.

The DC/DC converter 60 generates a DC voltage of a predetermined level based on the DC voltage supplied from either the AC adapter 29 or the battery 48, and supplies the generated DC voltage of the predetermined level to the individual components of the computer system. Since the DC voltage from the AC adapter 29 or the battery 48 is 18 V, DC voltages of +5 V, +12 V and −9 V are actually supplied to predetermined components.

The voltage detector 61 detects an adapter voltage of the AC adapter 29, i.e., the constant voltage output from the constant-voltage output terminal 29a. The voltage detector 62 detects the battery voltage of the battery 48. Based on these detected voltages, it is determined whether the AC adapter 29 or the battery 48 is connected to the computer system.

The FET switch 70 is used to supply or stop supplying the DC voltage to the DC/DC converter 60 from the AC adapter 29 or the battery 48. When the FET switch 70 is on, the DC voltage is supplied to the DC/DC converter 60. Therefore, the DC/DC converter 60 can supply the above-described voltage of the predetermined level to each component.

The FET switch 71 is used to supply the DC voltage from the battery 48 through the FET switch 70 to the DC/DC converter 60. When the FET switch 71 is turned on, the DC voltage can be supplied to the DC/DC converter 60 from the battery 48.

The FET switch 72 is utilized to supply the constant current from the constant-current output terminal 29c of the AC adapter 29 to the battery 48. When the FET switch 72 is on, the constant current is supplied to the battery 48 for rapid charge.

The FET switch 73 is used to supply the constant voltage from the constant-voltage output terminal 29a of the Ac adapter 29 to the battery 48. When the FET switch 73 is on, the constant voltage is supplied to the battery 48 through the resistor 66 for trickle charge.

The trickle charge represents that a rechargeable battery, even after fully charged by an AC adapter, continues to be charged all the time with a current smaller than a charging current.

The resistor 65 as a current limiting resistor, used to inhibit supplying of a large current to the battery 48, has usually a high resistance.

The resistor 66, used for trickle charge, has usually a low resistance, for example, several tens Ω.

The power supply controller 50 has a CPU 51, a RAM 52, a ROM 53, a timer 54, an output port 55, an A/D converter 56 and an input port 57.

The CPU 51, constituted by one chip, controls a voltage supply to the individual component, and rapid charge/trickle charge to the battery 48.

The ROM 53 stores control programs, etc. to be used for the voltage supply control and the rapid charge/trickle charge control.

The RAM 52 is used as the main memory of the CPU 51. Assigned to the RAM 52 are various memory areas, as a flag, a counter and the like, used to the voltage supply control and the rapid charge/trickle charge control.

The timer 54 outputs a timer value to the CPU 51 by a predetermined cycle.

The output port 55 outputs a control signal individually to the control-signal input terminal 29b of the AC adapter 29, and the FET switches 70, 71, 72 and 73, and transmits data to the power supply interface 28. In response to the control signal at the control-signal input terminal 29b, the AC adapter 29 outputs the constant current or the constant voltage. The FET switches 70, 71, 72 and 73 are turned on or off depending on the received control signals at each FET switch.

The A/D converter 56 converts analog voltages output respectively from the voltage detectors 61 and 62 into digital voltages.

The input port 57 receives a signal indicating whether the power supply switch 45 is depressed. As shown in FIG. 3, the level of a voltage to the input port 57 is Vcc as long as the power supply switch 45 is not depressed. Since the power supply switch 45 is a momentary switch as described above, however, the level of the received voltage at the input port 57 is "0" during a predetermined period of time upon each depression of the power supply switch 45. By detecting a change in voltage level, therefore, it can be determined whether the power supply switch 45 is depressed.

Control of DC-voltage supplied from the power supply circuit 30 to individual components in accordance with the switching status of the power supply switch 45 will be described, referring to a flowchart illustrated in FIG. 4. FIG. 4 shows a flowchart for the first voltage supply control executed by the CPU 51 in the power supply controller 50.

The CPU 51 in the power supply controller 50 executes a first voltage supply control program stored in the ROM 53. This voltage supply control includes control to be executed in the case where the power supply switch 45 is depressed immediately after the power supply circuit 30 stops supplying a voltage to the individual components.

In the first voltage supply control, the contents of a memory area in the RAM 52 assigned as a counter, or a count value is referred to. According to this embodiment the count value has any of three values, "0," "1" and "2," and is repeatedly counted up in the order of "0," "1," "2," "0," "1," "2," and so forth. The count value "0" represents that voltage supply to the individual components is possible. The count value "1" represents that inhibition of voltage supply to the individual components is possible, and the count value "2" represents that voltage supply to the individual components is inhibited until a predetermined period of time elapses, as described later. At the beginning of this voltage supply control, the count value is set to "0."

In step A1, it is determined whether or not the count value is "0." If the count value is "0" in step A1, it is then determined whether or not the power supply switch 45 is depressed in step A4.

When it is determined in step A4 that the power supply switch 45 is depressed, a control signal is produced to turn on the switch 70 (step A5). This control signal is output to the switch 70 from the output port 55. Consequently, a DC voltage is supplied to the DC/DC converter 60 from the AC adapter 29 or the battery 48.

In step A6, the count value is incremented from "0" to "1."

When the count value is not "0" in step A1, it is determined whether or not the count value is "1" in step A2. If the count value is "1" in step A2, it is then determined whether or not the power supply switch 45 is depressed in step A7.

When the power supply switch 45 is depressed in step A7, a control signal is produced to turn off the switch 70 (step A8). This control signal is output to the switch 70 from the output port 55. This inhibits the AC adapter 29 or the battery 48 to supply a DC voltage to the DC/DC converter 60.

In step A9 the count value is incremented from "1" to "2."

In step A10, after the timer value in the timer 54 is reset, a control signal to start the timer 54 is produced.

When the count value is not "1" in step A2, it is determined whether or not the timer value in the timer 54 is greater than a preset timer value corresponding to a preset time (e.g., 1 second).

When the timer value in the timer 54 is greater than the preset timer value in step A10, the count value is reset, that is, the count value is changed from "2" to "0."

Under this voltage supply control, even in the case where immediately after the power supply switch 45 is depressed to inhibit a voltage to the individual components, the power supply switch 45 is depressed again, the count value will not become "0" until the timer value in the timer 54 becomes greater than the preset timer value (corresponding to, for example, 1 second as mentioned above). Within this period, the switch 70 will not be turned on, the voltage supply to the individual components is inhibited. After this period elapses, the voltage supply to the individual components is possible. In other words, even when the power supply switch 45 is depressed immediately after the switch 70 is off, this computer system can operate properly.

Referring to flowcharts illustrated in FIG. 5 and FIGS. 6A and 6B, control of DC-voltage supplied from the power supply circuit 30 to individual components in accordance with the switching status of the power supply switch 45 in the case where a resume process can be executed, will be described. FIG. 5 shows an operational flowchart for the main CPU 11 capable of performing a resume process according to the embodiment of this invention, and FIGS. 6A and 6B a flowchart for the second voltage supply control executed by the CPU 51 in the power supply controller 50 according to this embodiment.

The main CPU 11 executes a control program having a resume function stored in the ROM 12 when a voltage is supplied from the power supply circuit 30.

In FIG. 5, it is determined whether or not a resume flag is set in step B1. This resume flag is assigned to, for example, a predetermined memory area in the RAM 13 and is used as a flag representing whether the resume process is necessary. When the resume flag is set, it represents that backup data is stored in the backup RAM 19.

When the resume flag is not set in step B1, the ordinary initialization process is executed (step B2), and a switch effective command indicating completion of the initialization process is output to the power supply interface 28 (step B3). Then, since the operating system (OS) of this computer system is activated, various types of application programs can be executed.

When the resume flag is set in step B1, the resume process is performed in step B4. That is, the backup data is read out from the backup RAM 19. In step B5, the switch effective command indicating the completion of the resume process is output to the power supply interface 28. This restores the system to the state immediately before the deactivation of the power supply.

Meanwhile, the CPU 51 of the voltage supply controller 50 executes a second voltage supply control program stored in the ROM 53. This voltage supply control includes control to be executed in the case where the power supply switch 45 is depressed during execution of the resume process, i.e., a request to deactivate the power supply is provided during execution of the resume process.

In the second voltage supply control, the contents of a memory area in the RAM 52 assigned as a flag are referred to. A switch invalid flag indicates whether or not the depression of the power supply switch 45 should be disregarded. When the switch 70 is turned on, the switch invalid flag is set to "1." When the power supply switch 45 is depressed in this condition, therefore, the turn on/off of the switch 70 will not be performed. That is, the current voltage supplying state is maintained. When the switch effective command from the CPU 11 is received at the input port 57 via the power supply interface 28, or when the timer value in the timer 54 is larger than a timer value corresponding to a set time (e.g., 20 seconds), the switch invalid flag is set to "0." When the power supply switch 45 is depressed in this condition, the switch 70 is turned on or off.

A switch on flag indicates whether the power supply switch 45 is depressed. The switch on flag is set to "1" when the power supply switch 45 is depressed with a state wherein the switch invalid flag set to "0." In this case, the switch 70 is turned on or on. When the switch 70 is turned on or off, the switch on flag is set to "0."

Figure 6A:
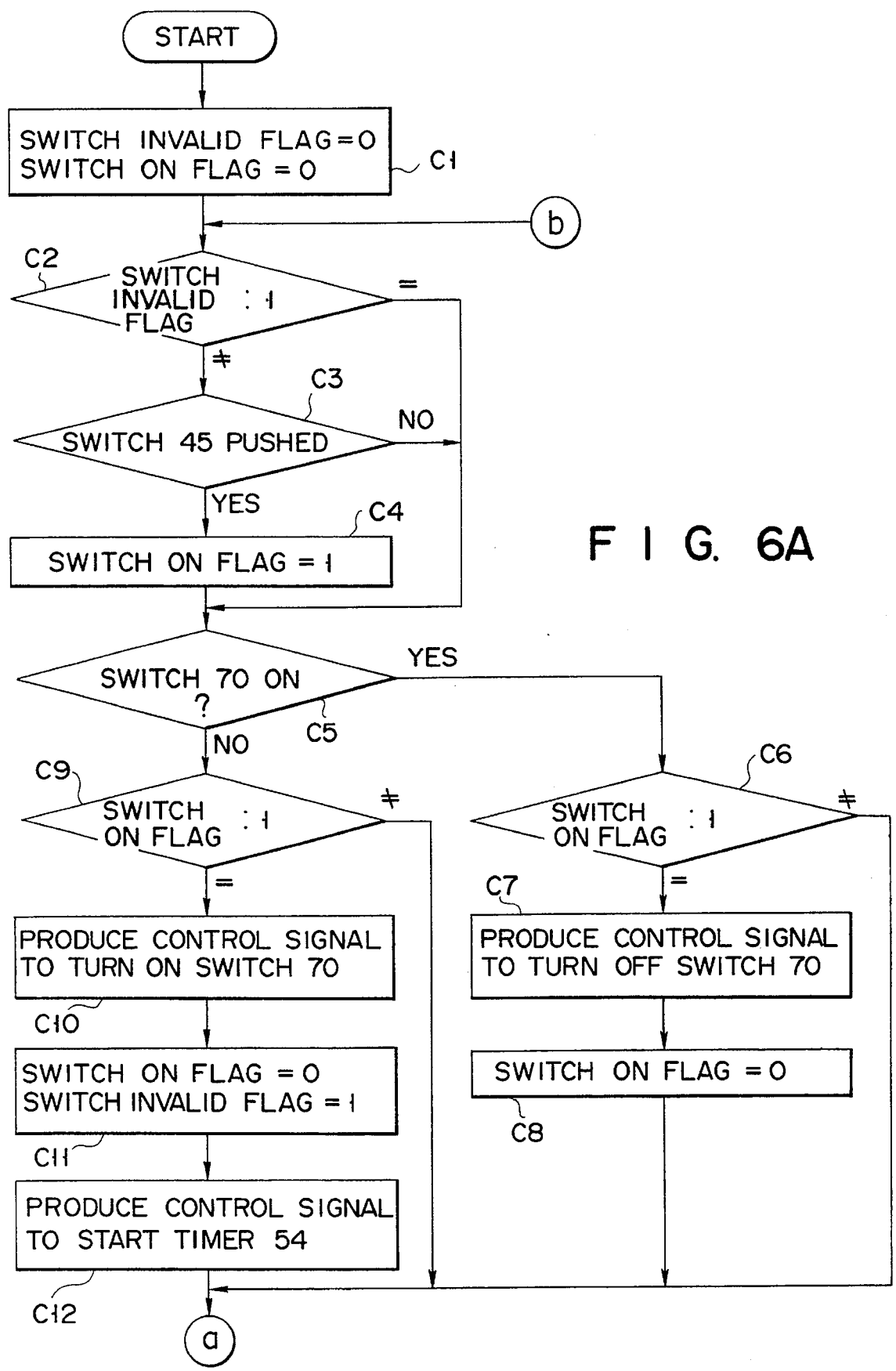
FIGS. 6A and 6B present a flowchart for the second voltage supply control executed by the CPU in the power supply controller according to the embodiment of this invention.
Figure 6B:
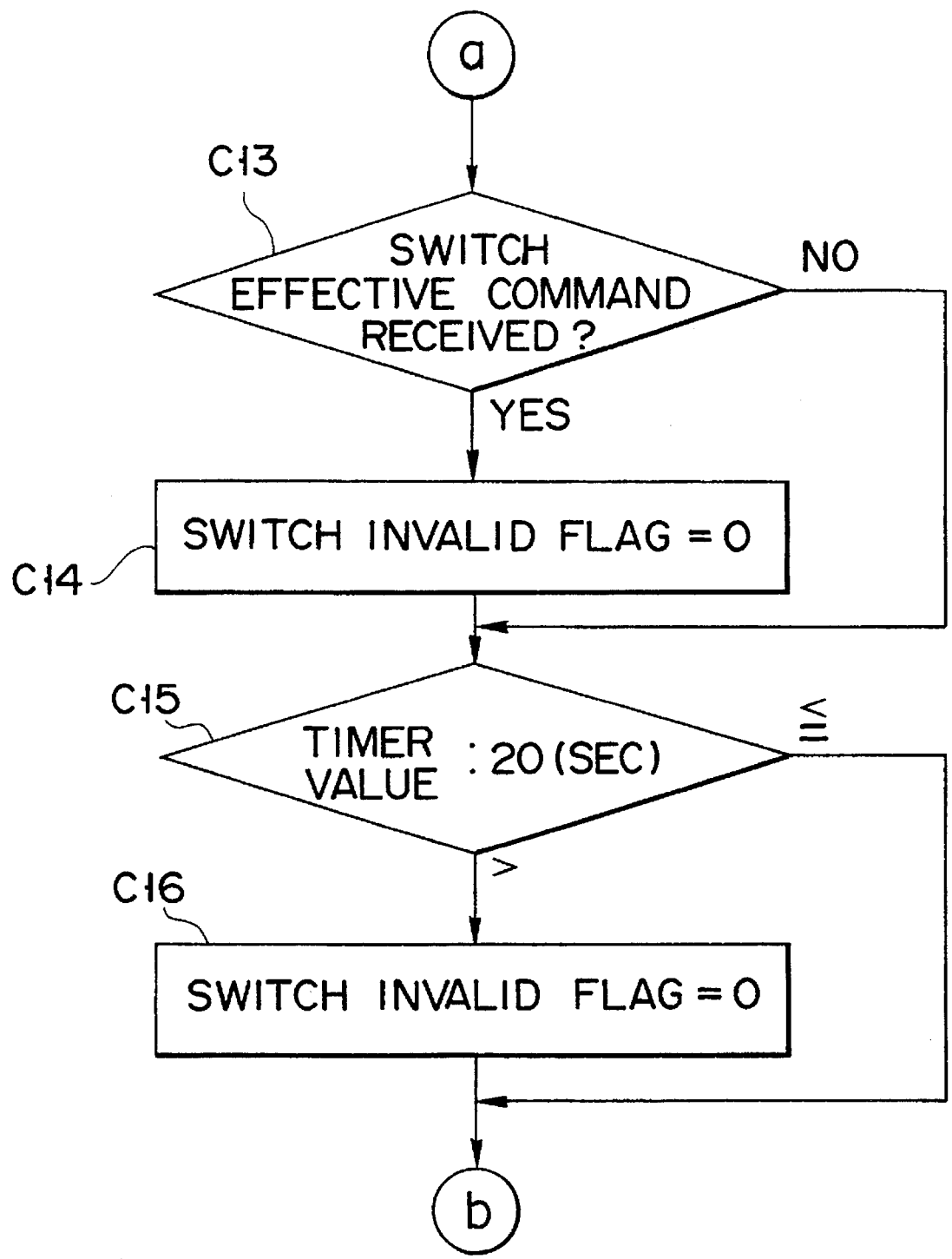

Referring to FIGS. 6A and 6B, in step C1, the switch invalid flag and switch on flag are both set to an initial value of "0."

In step C2, it is determined whether or not the switch invalid flag is "1." That is, it is determined whether or not the switch 70 can be turned on or off by the depression of the power supply switch 45.

When it is determined in step C2 that the switch invalid flag is "0," it is determined whether or not the power supply switch 45 is depressed in step C3. When, in step C3, the power supply switch 45 is depressed, the switch on flag is set to "1" (step C4). When the power supply controller 50 is in the initial state or when the switch 70 is off, the switch invalid flag is "0." Therefore, the switch on flag is always set to "1" when the power supply switch 45 is depressed with a state wherein the switch 70 is off.

In step C5, it is determined whether the switch 70 is turned on. When the switch 70 is turned on in step C5, it is determined whether or not the switch on flag is set to "1" in step C6.

When the switch on flag is "1" in step C6, a control signal to turn off the switch 70 is produced (step C7). This control signal is output from the output port 55 to the switch 70. The switch on flag is then set to "0" (step C8).

When it is determined in step C5 that the switch 70 is not turned on, it is then determined whether or not the switch on flag is set to "1" in step C9. When the switch on flag is "1" in step C9, a control signal to turn on the switch 70 is produced (step C10). This control signal is output from the output port 55 to the switch 70. In step C11, the switch on flag is set to "0," and the switch invalid flag to "1."

In step C12, after the timer value in the timer 54 is reset, a control signal to start the timer 54 is produced.

In step C13, it is determined whether or not the switch effective command is received at the input port 57. When the switch effective command in received, the switch invalid flag is set to "0" (step C14).

In step C15, it is determined whether or not the timer value in the timer 54 is larger than a timer value corresponding to a set time (e.g., 20 seconds). When the timer value in the timer 54 is larger than the timer value corresponding to the set time, the switch invalid flag is set to "0" (step C16).

The processes of steps C15 and C16 are provided for the following reason. Because, if the main CPU 11 cannot output the switch effective command to the CPU 51 in the power supply controller 50 for failures, the switch 70 will not be turned off permanently without executing those processes.

Through the above-described sequence of processes, even when the power supply switch is turned off during execution of the resume process, a resume error will not occur and the backup data can be restored properly.

Further, even when the power supply switch is turned off during execution of the resume process in a computer system using 80386SL CPU by Intel corporation, it is possible to prevent runaway of this CPU.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power control apparatus to which a plurality of components are connected, comprising:

supplying means for supplying voltage to the components;

a momentary switch capable of being depressed by a user;

a timer for counting a predetermined period of time;

a memory retaining status information represented by one of a first, a second and a third value, the first value indicating that voltage supply to the components is possible, the second value indicating that prevention of voltage supply to the components is possible, and the third value indicating that voltage supply to the components is being inhibited; and control means for monitoring the status information in said memory and a depression of said momentary switch and thereby controlling power supply to the components, including:

means, in response to the depression of said momentary switch while the status information represents the first value, allowing voltage supply to the components and changing the first value to the second value, means, in response to the depression of said momentary switch while the status information represents the second value, inhibiting voltage supply to the components, changing the second value to the third value, and starting said timer, and means, in response to a termination of running of said timer while the status information represents the third value, changing the third value to the first value.

2. The apparatus according to claim 1, further comprising a switch for switching between allowance and inhibition of the voltage supply to the components.

3. The apparatus according to claim 1, wherein said control means includes means for executing soft-start control.

4. A power control apparatus to which a plurality of components are connected, comprising:

supplying means for supplying voltage to the components;

a momentary switch capable of being depressed by a user;

a timer for counting a predetermined period of time;

a memory retaining status information having a switch-invalid flag which indicates whether a depression of said momentary switch should be disregarded; and control means for monitoring the status information in said memory and a depression of said momentary switch, and thereby controlling power supply to the components, including:

first means, in response to a depression of said momentary switch while voltage supply is inhibited, allowing voltage supply to the components, setting the switch-invalid flag to "on" and starting said timer, second means, in response to a depression of said momentary switch while voltage supply is inhibited, executing a resume process, third means, in response to a completion of said resume process, setting the switch-invalid flag to "off", and fourth means, in response to a termination of running of said timer, setting the switch-invalid flag to "off".

5. The apparatus according to claim 4, further comprising a switch for switching between allowance and inhibition of the voltage supply to the components.

6. The apparatus according to claim 4, wherein the status information in said memory further includes a switch-on flag which indicates whether said momentary switch has been depressed.

7. The apparatus according to claim 4, wherein said control means further includes means for, in response to the completion of the resume process, generating a switch effective command indicating that the resume process has completed.

8. The apparatus according to claim 7, wherein said third means further includes means for, in response to the switch effective command generated, setting the switch-invalid flag to "off".

9. The apparatus according to claim 4, wherein the status information in said memory further includes a resume flag which indicates whether the resume process is necessary.

10. The apparatus according to claim 9, wherein said resume process executing means executes the resume process in response to the status "on" of said resume flag.

11. The apparatus according to claim 10, further comprising means for executing an initialization process in response to a status "off" of said resume flag.

* * * * *